Apr. 17, 1923.

H. W. B. GRAHAM

BRICKMAKING APPARATUS

Original Filed Sept. 5, 1918

Inventor
Henry W. B. Graham
by
Edward R. Alexander
attorney

Apr. 17, 1923.

H. W. B. GRAHAM

BRICKMAKING APPARATUS

Original Filed Sept. 5, 1918

Inventor
Henry W. B. Graham
by
Edward R. Alexander
attorney

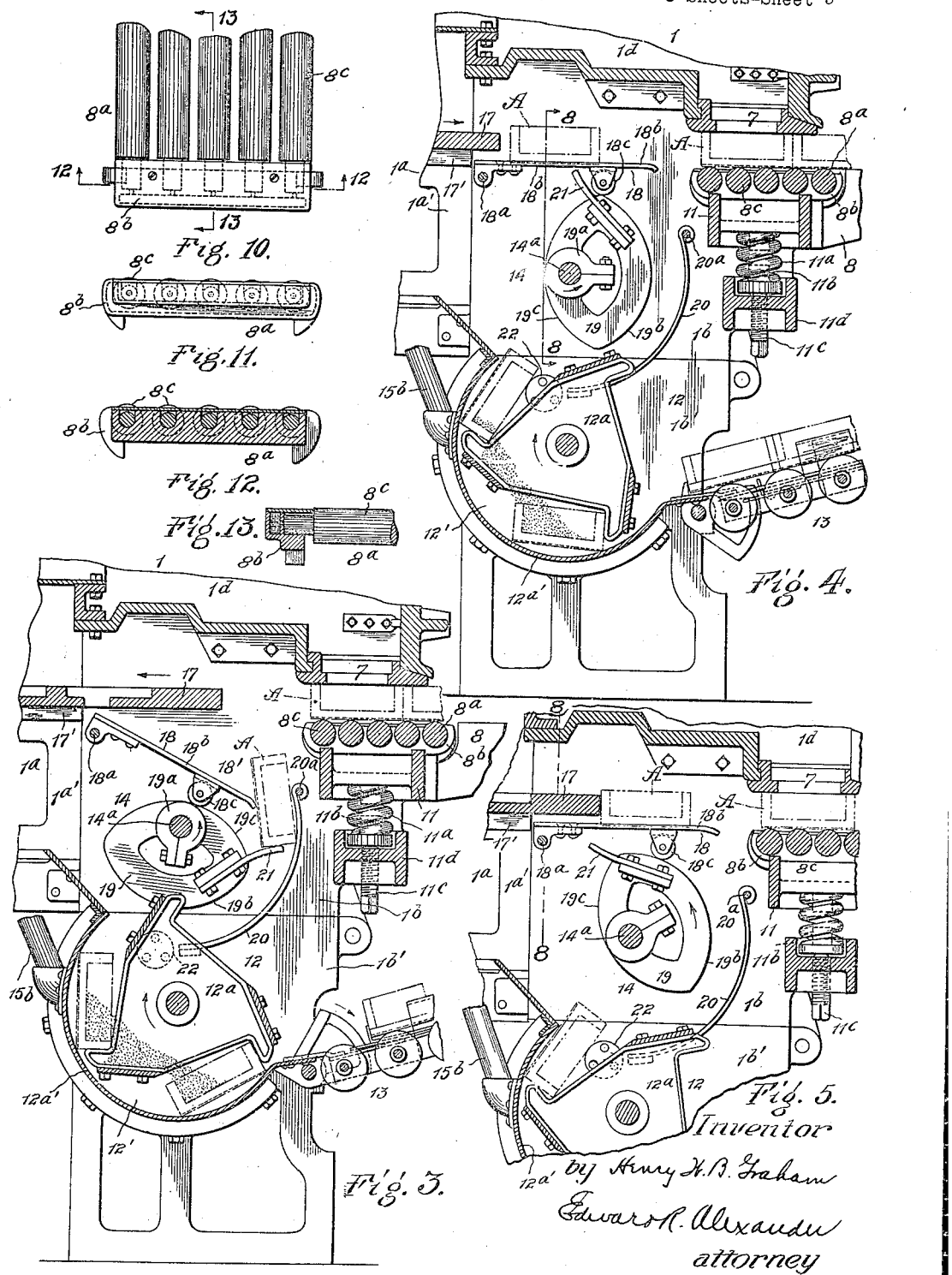

Apr. 17, 1923.
H. W. B. GRAHAM
1,452,152
BRICKMAKING APPARATUS
Original Filed Sept. 5, 1918
5 Sheets-Sheet 5
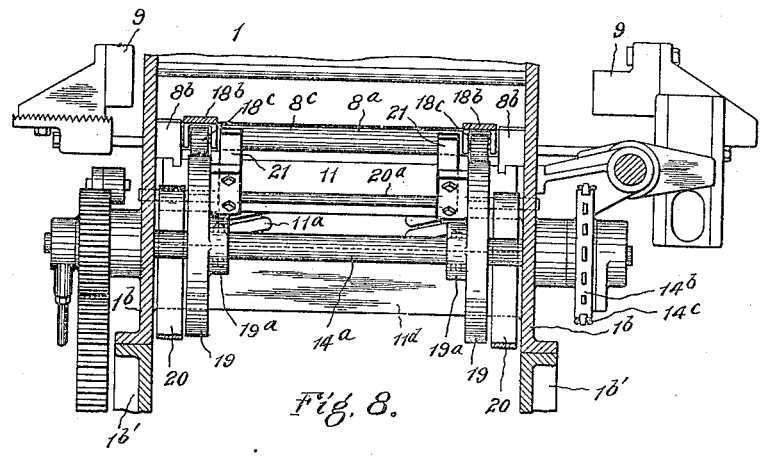
Fig. 8.
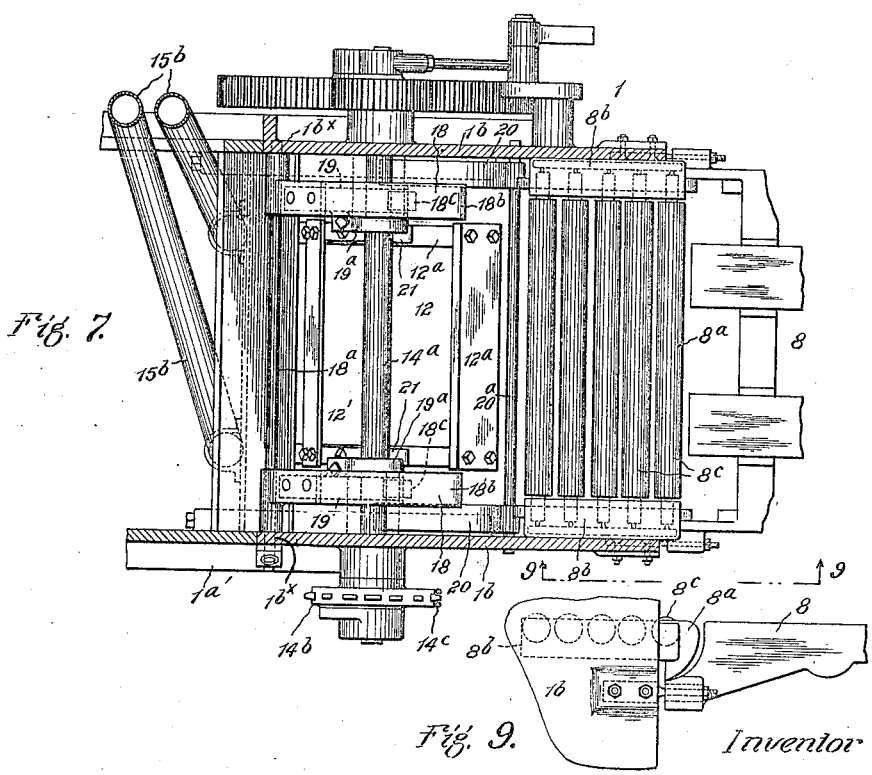
Fig. 7.
Fig. 9.
Inventor
Henry W. B. Graham
by Edward R. Alexander
attorney Patented Apr. 17, 1923.

1,452,152

UNITED STATES PATENT OFFICE.

HENRY W. B. GRAHAM, OF NEW LONDON, OHIO; MARGARET GRAHAM, EXECUTRIX OF SAID HENRY W. B. GRAHAM, DECEASED; SAID HENRY W. B. GRAHAM, ASSIGNOR TO THE ARNOLD-CREAGER COMPANY, OF NEW LONDON, OHIO, A CORPORATION OF OHIO.

BRICKMAKING APPARATUS.

Application filed September 5, 1918, Serial No. 252,681. Renewed May 25, 1922. Serial No. 563,674.

*To all whom it may concern:*

Be it known that I, HENRY W. B. GRAHAM, a citizen of the United States, residing at New London, in the county of Huron and State of Ohio, have invented certain new and useful Improvements in and Relating to Brickmaking Apparatus, of which the following is a specification.

This invention relates to brick making apparatus, particularly of the soft mud type. The invention is shown as applied to that type of apparatus wherein the empty molds are moved up through a delivery gap, examples of which apparatus are illustrated in my co-pending applications Ser. Nos. 83,052, now Patent 1,301,685, and 81,425, now Patent 1,341,798.

One object of the invention is to provide improved means for guiding and supporting the empty molds as they are returned to and positioned in front of the mold push out ready for filling.

Another object of the invention is to provide a relatively simple mechanism for positively delivering the molds to the position for engagement by the mold push-out.

Another object of the invention is to provide an improved construction which permits the molds to be positioned in front of the mold push-out and moved therefrom to the filling position without danger of being obstructed.

A further object of the invention is to improve the construction of mold operating mechanism and receiver disclosed in the aforesaid applications, whereby positive and uniform movement of the molds to the receiver and from the receiver to the filling station will be insured.

Other objects of the invention will be apparent to those skilled in the art to which my invention relates from the following description taken in connection with the accompanying drawings.

For the purpose of illustration I have, in the accompanying drawings, shown and herein described one form of mechanism embodying my invention.

Referring to the drawings,

Figs. 3 and 4 are fragmentary sectional views of the apparatus, illustrating the movement of the empty molds to the position for engagement by the mold push out.

Fig. 5 is a fragmentary sectional view showing the position of the parts and the mold after forward feeding of the latter has commenced.

Fig. 7 is a fragmentary sectional view on the line 7—7 of Fig. 2.

Fig. 8 is a detail view on the line 8—8 of Fig. 5.

Figs. 9, 10, 11, 12 and 13 are detail views of the mold support.

Figure 1:
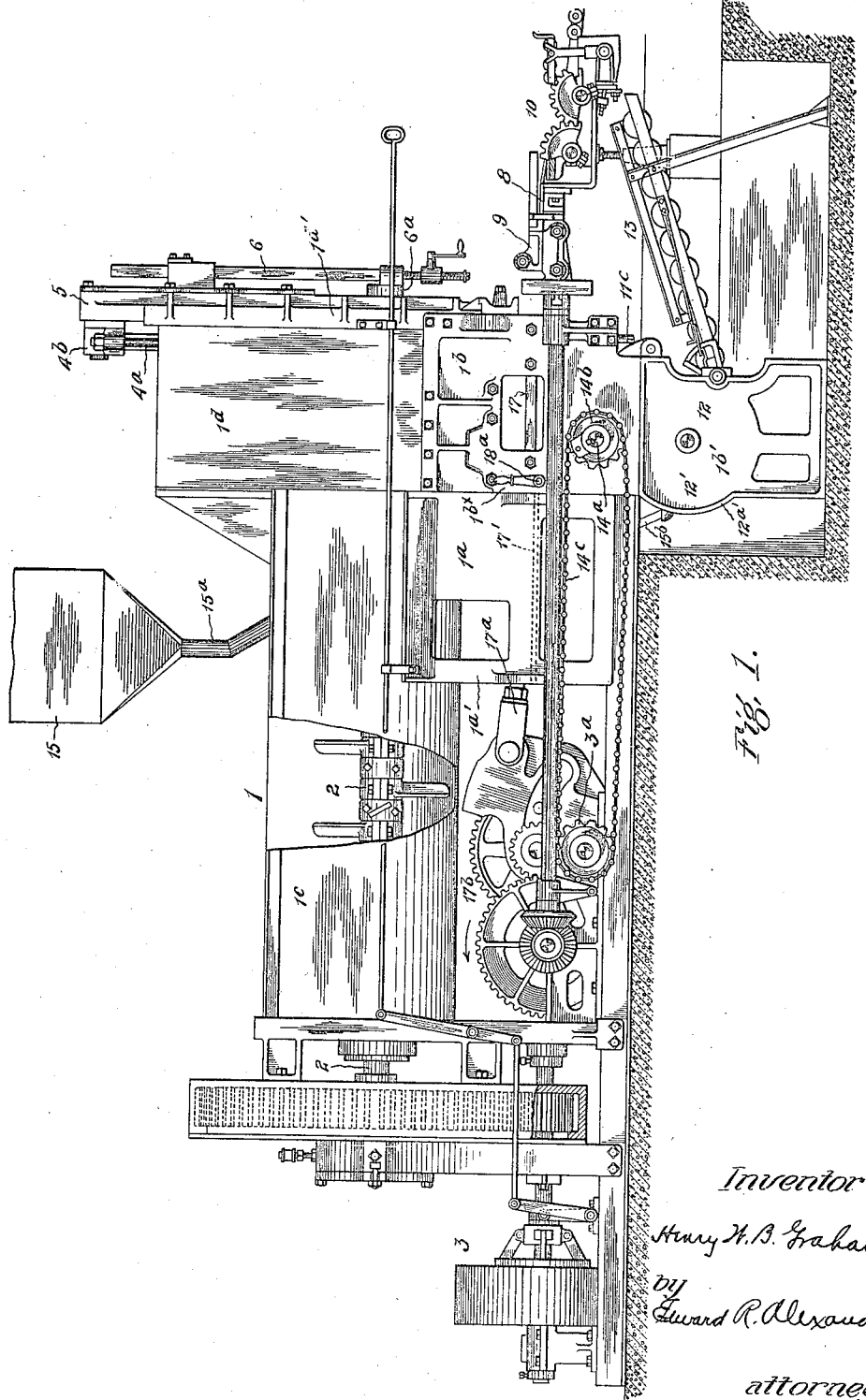
Fig. 1 is a side elevation, partly broken away, of a brick making apparatus embodying my invention.

In the drawings, 1 indicates as an entirety a brick making apparatus. This apparatus preferably comprises a suitable frame work 1ª, having upper and lower side plates 1ᵇ, 1ᵇ', 1ᵃ', a pug mill 1ᶜ, which may be horizontally disposed, and a charging chamber 1ᵈ. 2 indicates a pug shaft extending longitudinally of the pug mill 1ᶜ and driven by any suitable mechanism indicated as an entirety at 3. At its front end the shaft 2 is mounted in a suitable bearing in the front plate 1ᵈ', of the charging chamber 1ᵈ. 2ᵃ indicates a wiper fixed to the shaft 2 and adapted to force the material into the path of movement of a press-platen 4, in a well known manner.

The press-platen 4 is mounted to reciprocate in the charging chamber 1ᵈ. The press-platen 4 is connected by rods 4ᵃ with a cross head 4ᵇ, secured to a plunger 5, which in turn is connected to and operated by a pitman 6. The pitman 6 is connected to a crank 6ᵃ fixed to the front end of the pug shaft 2. The press platen operates to force the material through a die 7 into the empty molds A, being timed to move downwardly after an empty mold has been positioned below the die 7.

8 indicates a support to and over which the molds are moved, first to a position for filling, as already described, and then to the bumping mechanism, indicated as an entirety at 9 and emptying mechanism, indicated as an entirety at 10. No claim is made herein to the bumping and emptying mechanisms, as they form the subject-matter of my co-pending applications Ser. Nos. 228,640½, now Patent 1,350,604, 81,425, now Patent 1,341,798, and 277,286, to which reference is made for a detailed description thereof. The rear end of the support is preferably provided with a removable section 8ª, comprising a pair of side bars 8ᵇ, carrying a series of removable rollers 8ᶜ, which permit the molds to be easily moved to and from the filling position or station below the die 7. The support section 8ª may be mounted on a transverse frame 11 that is yieldingly supported by a plurality of springs 11ª surrounding rods 11ᵇ. The rods 11ᵇ may be adjustably supported on screw bolts 11ᶜ mounted in a bar 11ᵈ.

12 indicates as an entirety a sanding mechanism to which the empty molds are delivered by a conveying mechanism, indicated as an entirety at 13, after they have been emptied. The sanding mechanism is preferably arranged below and in the vertical plane of the brick machine and is interposed between the rear end of the conveying mechanism 13 and a mold operating and supporting mechanism, indicated as an entirety at 14.

15 indicates a sand supply bin having a chute 15ª leading to a feed mechanism 16 which forms the subject-matter of my co-pending application Ser. No. 252682 and to which reference is made for a further description thereof. 15ᵇ indicates pipes leading from the feed mechanism 16 to the chamber 12' of the sanding mechanism 12. 12ª indicates a rotating element carrying a plurality of members which engage the molds and move them through or around the chamber 12'. The bottom and rear wall 12ª for the sand chamber 12' is preferably curved about the axis of the chamber, whereby the molds are inverted, or partially inverted, and properly positioned or moved to a position for engagement by the mold delivery mechanism 14.

17 indicates a push out for the empty molds arranged successively to engage therewith, in the manner to be later described, to push them into the filling position, then to or relative to the bumping mechanism 9, and then to the emptying or separating mechanism 10. The push out 17 is slidably supported by and between the side plates 1ª′ of the machine 1, by means of guides 17'. The push out is connected to and reciprocated by a pitman 17ª. The pitman 17ª is operated by a suitable driving mechanism indicated as an entirety at 17ᵇ, which preferably is driven by the main drive mechanism 3. The pitman may be operated by any other mechanism, such for instance as that illustrated in my aforesaid applications Ser. Nos. 81,425 and 83,052.

Of the mold operating and supporting mechanism 14, 18 indicates a receiver for the empty molds. The receiver is arranged rearward of the support 8 and its front end is preferably spaced therefrom. The rear end of the receiver 18 is mounted on a transverse shaft 18ª, which may be loosely mounted at its opposite ends in openings 1ᵇˣ formed in the side plates 1ᵇ. The receiver preferably comprises a pair of spaced plates 18ᵇ, 18ᵇ arranged near the inner walls of the frame plates 1ᵇ. This arrangement leaves an open space through which surplus sand not adhering to the walls of the mold may drop back into the sand chamber 12'. The plates 18ᵇ are preferably rigidly secured to shaft 18ª, whereby they will swing together or simultaneously, as later set forth.

14ª indicates a shaft mounted in suitable bearings provided in the frame plates 1ᵇ. At one side the shaft extends through the plate 1ᵇˣ and has fixed to it a drive element, preferably a sprocket wheel 14ᵇ. 14ᶜ indicates a sprocket chain passing around the wheel 14ᵇ and also a sprocket wheel 3ª, which forms one of the driven elements of the drive mechanism 3. The shaft 14ª is preferably driven continuously, and at a rate of speed to permit it and the elements operated by it to co-operate with other operating elements of the apparatus.

Figure 2:
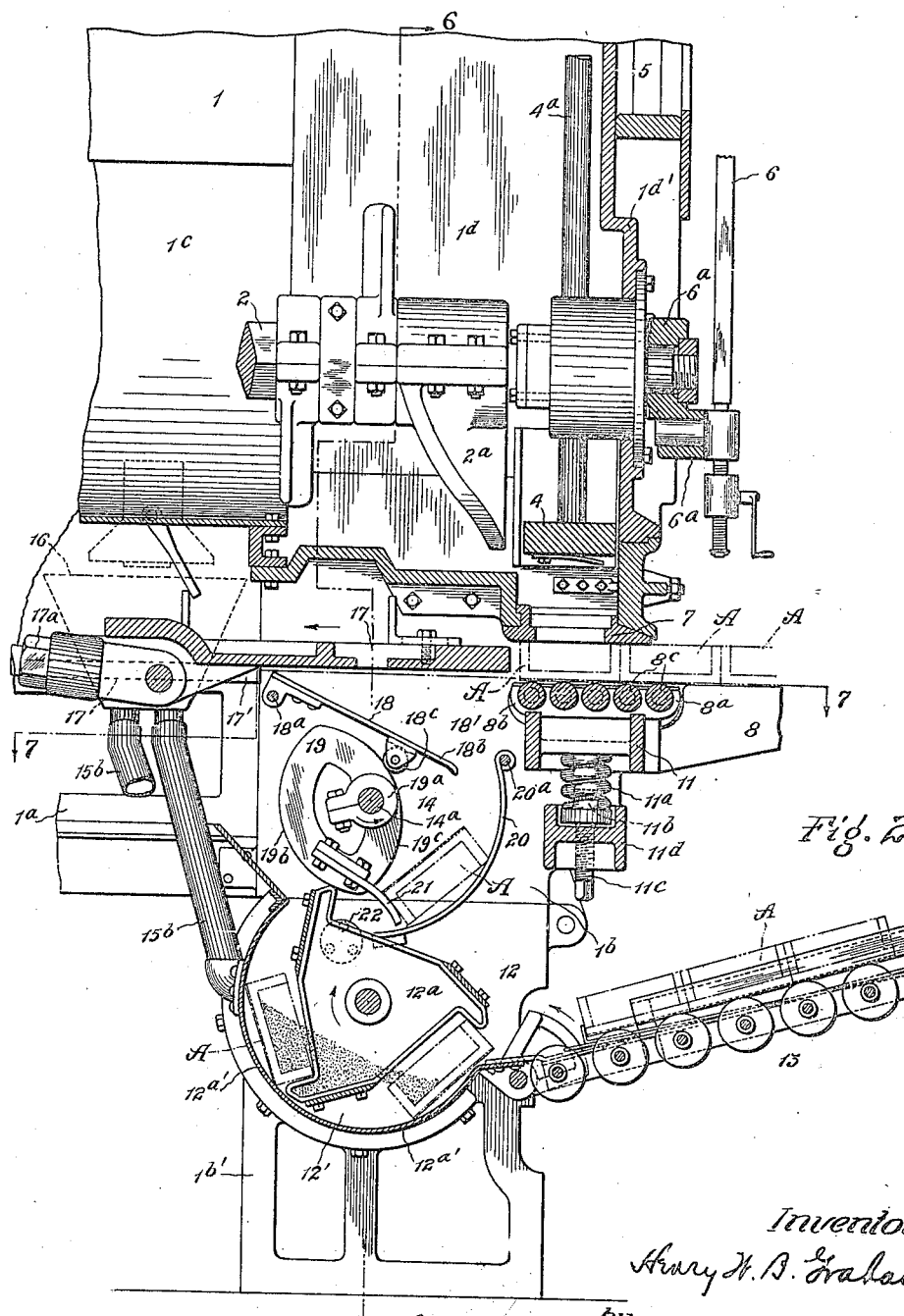
Fig. 2 is a fragmentary longitudinal sectional view of the brick making apparatus, illustrating the movement of the molds therethrough.
Figure 6:
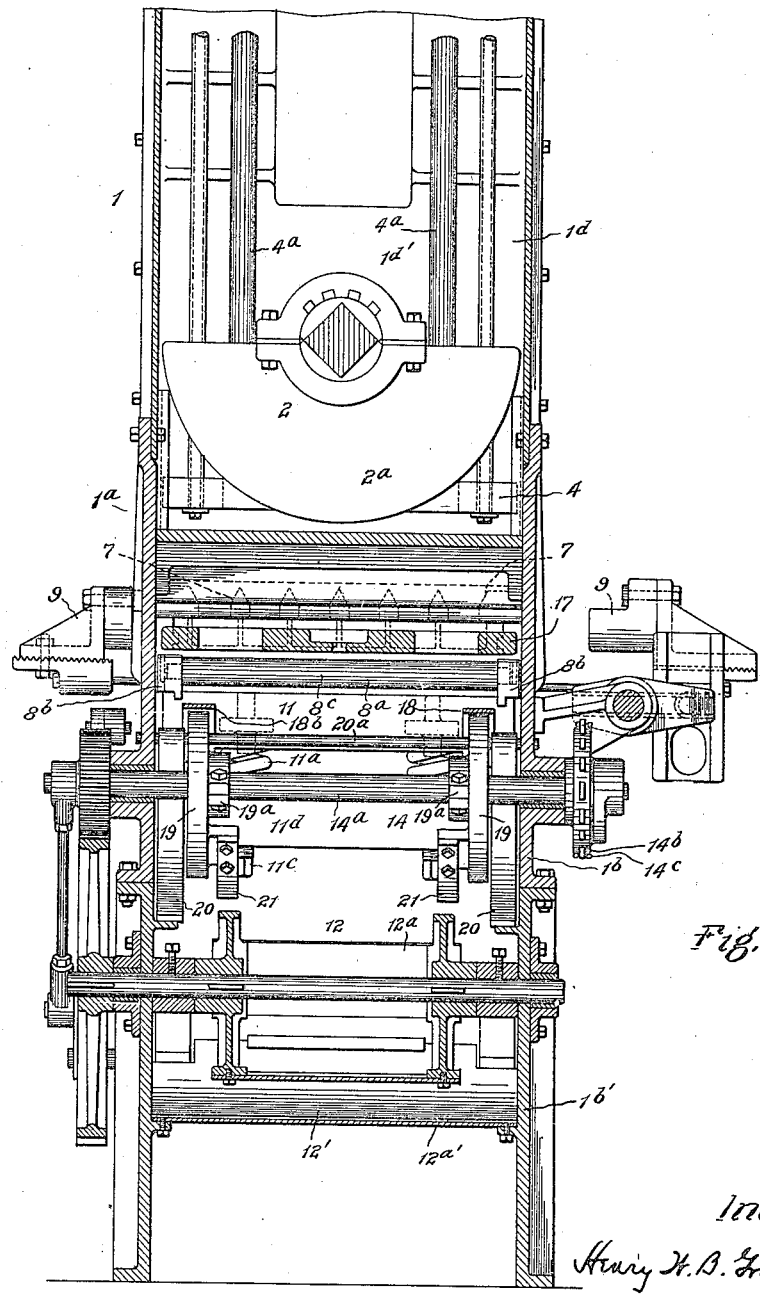
Fig. 6 is a fragmentary transverse sectional view on the line 6—6 of Fig. 2.

19 indicates a cam member secured to and rotated by the shaft 14ª. I preferably provide two cams 19, one for each receiver plate 18ᵇ, and arrange the cam members so that they will engage with and swing the front ends of the plates 18ᵇ upwardly and downwardly about the axis of the shaft 18ª. As a result of this operation, the receiver 18 is first moved downwardly to form a relatively wide unobstructed gap 18' rearward of the support 8 to permit the mold to be positioned on the receiver (see Fig. 3), and then moved upwardly to position the mold in line with or the plane of the support 8 (see Fig. 4), whereby the push out 17 may move the mold to the filling station. Each cam member 19 is preferably provided with a split collar 19ª, by means of which it may be adjustably fixed to the shaft 14ª. Each cam member preferably comprises two connected cams 19ᵇ, 19ᶜ, on which the front end of the adjacent receiver plate 18ᵇ rides. I preferably provide each plate 18ᵇ with an anti-friction roller 18ᶜ which runs on the cams 19ᵇ, 19ᶜ. As shown in the drawings, the cam 19ᵇ is substantially concentric to the axis of the shaft 14ª and is struck on a radius of such length that during the time the roller 18ᶜ is in engagement therewith, the receiver plate 18ᵇ will be maintained in a horizontal position (see Fig. 3); whereas, the cam 19ᶜ is eccentric to the axis of the shaft 14ª and so shaped and arranged that during the time the roller 18ᶜ is in engagement with the cam 19ᶜ, the receiver plate 18ᵇ will first be lowered (see Fig. 2) and then raised (see Figs. 3 and 4). While the plates 18ᵇ are thus being operated, an empty mold A is moved upwardly through the gap 18′ and positioned thereon (see Figs. 3 and 4) ready to be engaged by the push out 17, which at this time has moved to its rearmost position (Fig. 4) and is about ready to move forward. 20 indicates a guide arranged between the delivery end of the sanding mechanism 12 and the gap 18′. The guide 20 preferably comprises two curved strips connected at their upper ends to a cross rod 20ª supported by the side plates 1ᵇ, 1ᵇ′ and supported at their lower ends on lugs carried by the plates. The guide strips are preferably curved concentrically to the axis of the shaft 14ª.

21 indicates a thrust member or sweeper for engaging with and moving the molds A along the guides 20 and upwardly onto the receiver plates 18ᵇ. The thrust member is preferably operated by the shaft 14ª and is disposed angularly thereof to properly co-operate with the cams 19ᵇ, 19ᶜ, whereby it moves each mold upwardly and through the gap 18′ onto the plates 18ᵇ at or about the time the latter are in their lowermost position (see Fig. 3). The thrust member preferably comprises two arms, each of which may be fixed in any well known manner to one of the cam members 19. As shown in the drawings, the upper ends of the guides 20 curve rearwardly slightly to turn the molds A right side up and direct them over onto the receiver 18. It will be seen from the foregoing description that the elements constituting the mold operating and supporting mechanism co-operate to invert the molds, after they leave the sand mechanism, thus insuring the discharge of all sand not adhering to the mold walls, and to right them as they are delivered to the position for engagement by the forward feeding device or push-out 17; and it will also be seen that these elements operate to positively guide and control each mold and co-operate to form an unobstructed gap therefor, during the time it is being positioned in front of the push out 17. By swinging the receiver 18 downwardly at or prior to the time an empty mold is being moved upwardly, and then back to its normal or horizontal position, I am enabled to form a relatively large unobstructed gap or opening through which the mold may be delivered onto the receiver, and thereafter a substantially closed space between the front end of the receiver and the support 8. This construction is a relatively simple one and eliminates elements which are apt to get clogged and thus obstruct the movement of the molds or cause a stoppage of the apparatus and furthermore the construction is of such character that during the movement of the mold from the receiver to the filling station the gap is closed, or substantially closed, so that the molds cannot fall or drop downwardly onto the guides 20; hence, it insures positive and uniform movement of the molds to the position for forward feeding and from that position to the filling station, durability and continuous operation of the apparatus.

In this connection it will be noted that the sanding mechanism 12 and mold operating mechanism 14 are arranged below and in the vertical plane, but preferably rearwardly of the mold filling station. By this arrangement I am enabled to provide a very simple form of construction and to economize on labor and up-keep expense; I am also enabled to move the molds a relatively short distance, at the same time properly guide and manipulate them to discharge the surplus sand, right them and re-position them in front of the mold push out without any endwise movement.

22 indicates a pair of guide devices, preferably rollers, arranged adjacent to the front ends of the guide strips 20. The purpose of these rollers 22 is to guide the empty molds A upwardly and at an angle to guides 20, so that as they are engaged by the thrust member 21, which engagement takes place just before the molds clear the rollers 22; the molds will drop upon the guides 20 with considerable force or jar, the effect of which is to discharge from the mold all surplus and unnecessary sand.

While I have shown herein and correlated the mold operating mechanism with a mold sanding mechanism, it will be understood that the sanding mechanism could be omitted, if desired.

To those skilled in the art of making mechanism of the class described, many alterations in construction and widely differing embodiments and applications of my invention will suggest themselves without departing from the spirit and scope thereof. My disclosures and the description herein are purely illustrative and are not intended to be in any sense limiting.

What I claim is:

1. In apparatus of the class described, the combination with a brick machine having a filling station and a mold push out, of means for moving empty molds into position for feeding to said filling station, said means including a swingable receiver adapted to support a mold in position for engagement by said push-out.

2. In apparatus of the class described, the combination with a brick machine having a filling station, of means for moving empty molds into position for feeding to said filling station, said means including a swingable receiver, and means for controlling said receiver.

3. In apparatus of the class described, the combination with a brick machine having a filling station, of a receiver arranged rearward of said filling station and movable to form a gap, and means for moving a mold through the gap onto said receiver when the latter is operated.

4. In apparatus of the class described, the combination of a brick machine having a mold receiver and a mold filling station, of means for moving empty molds to said receiver, said receiver being swingable to form a gap through which the empty mold is moved and to support the mold while being fed to said filling station.

5. In apparatus of the class described, the combination with a brick machine having a filling station, of a receiver movable vertically to form a gap, and means for moving a mold through the gap onto said receiver when the latter is operated.

6. In apparatus of the class described, the combination with a brick machine having a filling station, of a receiver movably mounted thereon, and adapted to support a mold, and means operating to move the receiver to form a gap and move an empty mold therethrough onto said receiver.

7. In apparatus of the class described, the combination with a brick machine having a filling station, of a swingable receiver adapted to support a mold, and means operating to swing one end of the receiver downwardly to form a gap and move an empty mold therethrough onto said receiver.

8. In apparatus of the class described, the combination with a brick machine having a filling station and a mold push-out, of a receiver arranged to support a mold while being moved by said push-out to said filling station, but movable to form a gap through which the mold is moved onto said receiver, and means for moving an empty mold through the gap onto said receiver.

9. In apparatus of the class described, the combination with a brick machine having a filling station, of a receiver arranged to support a mold while being moved to said filling station, but movable to form a gap through which the mold is moved onto said receiver, means for controlling the movements of said receiver, and means carried by said controlling means for moving an empty mold through the gap onto said receiver.

10. In apparatus of the class described, the combination with a brick machine having a filling station, of a receiver disposed rearward of said filling station and arranged to support a mold as it moves to said filling station, said receiver being movable downwardly to form a gap, and means for controlling the movements of said receiver and for moving an empty mold through the gap onto said receiver when it is moved downwardly.

11. The combination with a brick machine having a filling station, of a receiver adapted to support a mold, said receiver being movable to form a gap, a mold sanding mechanism arranged below said receiver, and means interposed between the sanding mechanism and said receiver for moving a mold onto said receiver when it is opened.

12. The combination with a brick machine having a filling station, of a receiver adapted to support a mold, said receiver being movable to form a gap, a mold sanding mechanism arranged below said filling station, and means interposed between the sanding mechanism and said receiver for moving a mold onto said receiver when it is opened.

13. In apparatus of the class described, the combination with a brick machine having a filling station, of a pivoted receiver on which molds are positioned for feeding to said filling station, a device for swinging said receiver to form a delivery gap, and means for moving a mold up through the gap when said receiver is open.

14. The combination with a brick machine having a filling station, of a receiver arranged rearward of the filling station, said receiver being movable to form a gap, a mold sanding mechanism arranged below and in the vertical plane of said filling station, and means interposed between the sanding mechanism and said receiver for operating said receiver and for moving a mold onto said receiver when it is opened.

15. In apparatus of the class described, the combination with a brick machine having a filling station, of a pivoted receiver on which molds are positioned for feeding to said filling station, a cam member on which the receiver rides permitting the receiver to swing to form a delivery gap, and means for moving a mold up through the gap when said receiver is operated.

16. In apparatus of the class described, the combination with a brick machine having a filling station, of a receiver pivoted at one end to the framework of said machine, means for moving a mold upwardly onto said receiver, and means permitting the opposite end of said receiver to swing downwardly prior to the upward movement of the mold to form a gap or delivery opening therefor.

17. The combination with a brick machine having a filling station, of a receiver pivotally mounted on the machine and adapted to support a mold, a cam member having two cams arranged to engage said receiver, one cam operating to support said receiver in a position to support the mold as it moves to said filling station, and the other cam operating to swing the receiver to form a delivery gap, and means for moving the mold onto said receiver when it is opened.

18. The combination with a brick machine having a filling station, of a pivotally mounted receiver adapted to support a mold, a cam member having two connected cams arranged to engage said receiver, one cam operating to support said receiver in a position to support the mold as it moves to said filling station, and the other cam operating to swing the receiver to form a delivery gap, and means for moving a mold onto said receiver when it is opened.

19. The combination with a brick machine having a filling station, of a pivotally mounted receiver arranged to support a mold, a cam member having two cams arranged to engage said receiver, one cam operating to support said receiver in a position to support the mold as it moves to said filling station, and the other cam operating to swing the receiver to form a delivery gap, and means carried by the cam member for moving the mold onto said receiver when it is opened.

20. The combination with a brick machine having a filling station, of a pivoted receiver arranged to support a mold, a pair of cam members each having two cams arranged to engage said receiver, one cam on one member and the corresponding cam on the other member operating to support said receiver in a position to support the mold as it moves to said filling station, and the other cams operating to swing the receiver to form a delivery gap, and means for moving a mold onto said receiver when it is opened.

21. In apparatus of the class described, the combination with a brick machine having a filling station, of a receiver pivoted at its rear end to the framework of said machine, a rotatable member on which the front end of the receiver is supported, said member having a cam which permits the front end of the receiver to swing downwardly, and means co-operating with said member to position a mold on said receiver when it swings downwardly.

22. In apparatus of the class described, the combination with a brick machine having a filling station and a mold push-out, of a receiver pivoted at its rear end to the frame of said machine, means for supporting the front end of said receiver, said means being constructed and arranged to permit the receiver to swing downwardly to form a gap in correlation to the movement of said push-out, and means for moving a mold through the gap onto said receiver when the latter is operated.

23. In apparatus of the class described, the combination with a brick machine having a filling station, of a receiver normally arranged in a position to support a mold as it moves to said filling station and movable downwardly to form a gap, means for controlling the movements of said receiver, guides for said molds, and means for moving an empty mold along the guides through the gap onto said receiver when it is open.

24. In apparatus of the class described, the combination with a brick machine having a filling station, of a receiver normally arranged in a position to support a mold as it moves to said filling station and movable downwardly to form a gap, means for controlling the movements of said receiver, guides for said molds, and means for moving an empty mold along the guides through the gap onto said receiver when it is open, said guides operating to move the mold laterally onto said receiver.

25. In apparatus of the class described, the combination with a brick machine having a filling station, of a receiver normally arranged in a position to support a mold at is moves to said filling station and movable downwardly to form a gap, means for controlling the movements of said receiver, guides for said molds, and means for moving an empty mold along the guides through the gap onto said receiver when it is open, said guides operating to right the mold as it is delivered to said receiver.

26. In apparatus of the class described, the combination with a brick machine having a filling station, of a receiver arranged rearward of the filling station and pivoted at its rear edge to the frame of said machine, the front edge of said receiver being movable downwardly to form a delivery gap, a guide arranged to deliver the molds to said receiver when it swings downwardly, and means for moving the molds along said guide.

27. In apparatus of the class described, the combination with a brick machine having a filling station, of a receiver arranged rearward of the filling station and pivoted at its rear edge to the frame of said machine, the front edge of said receiver being movable downwardly to form a delivery gap, a guide arranged to deliver the molds to said receiver when it swings downwardly, and means for moving the molds along said guide, the upper end of the guide being arranged to direct the molds laterally onto said receiver.

28. In a brick making machine, the combination of a pair of supports correlated to support molds and permit movement thereof from one support to the other, means for moving molds from one support to the other, one of said supports being pivoted whereby it may be moved to form a gap between them, and means for operating said pivoted support about its pivot to permit the delivery of a mold through the gap and the positioning of the mold on one of said supports.

29. In a brick making machine, the combination of a pair of supports correlated to support molds and permit movement thereof from one support to the other, means for moving molds from one support to the other, one of said supports being pivoted whereby it may be moved to form a gap between them, and means for operating said pivoted support about its pivot to permit the delivery of a mold through the gap and the positioning of the mold on said pivoted support.

In testimony whereof I affix my signature, in the presence of a witness.

HENRY W. B. GRAHAM.

Witness:
J. F. ATEN.